W. L. CHURCHILL & J. L. ENGLEHART.
Treating Animal Fats and Manufacturing Artificial Butter.
No. 154,372. Patented Aug. 25, 1874.
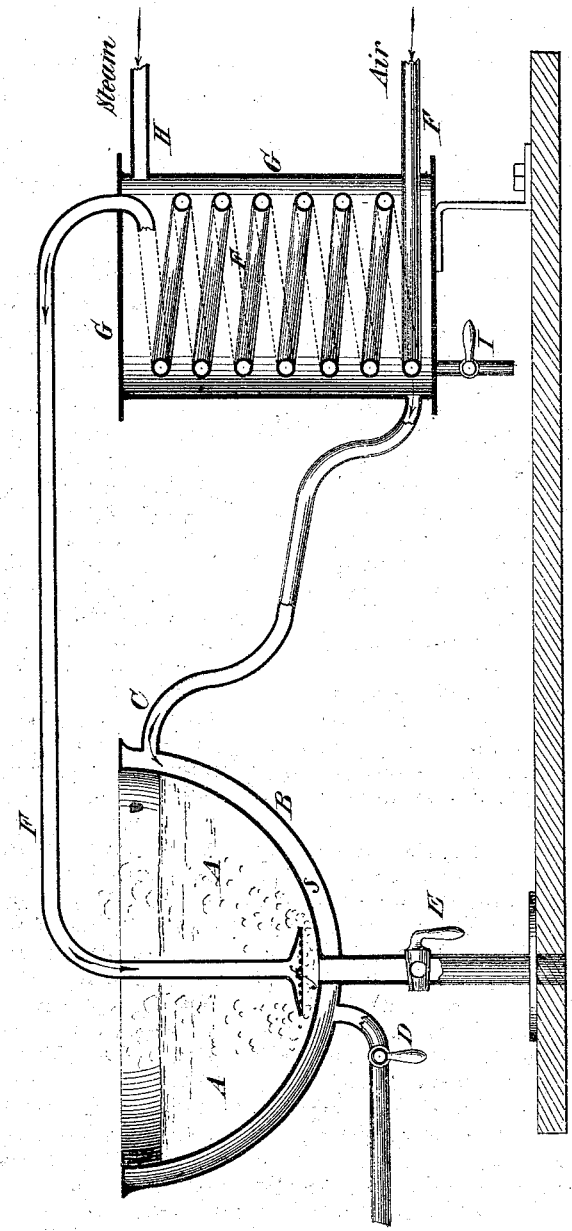

UNITED STATES PATENT OFFICE.

WILLIAM L. CHURCHILL, OF RAHWAY, NEW JERSEY, AND JACOB L. ENGLE-HART, OF NEW YORK, N. Y., ASSIGNORS TO CHURCHILL DAIRY COMPANY, OF NEW YORK CITY.

IMPROVEMENT IN TREATING ANIMAL FATS AND MANUFACTURING ARTIFICIAL BUTTER.

Specification forming part of Letters Patent No. 154,372, dated August 25, 1874; application filed May 25, 1874.

*To all whom it may concern:*

Be it known that we, WILLIAM L. CHURCHILL, of Rahway, in the county of Union and State of New Jersey, and JACOB L. ENGLEHART, of the city, county, and State of New York, have invented new and useful Improvements in the Manufacture of Artificial Butter, of which the following is a specification:

The herein-described improvements have reference to a new process and apparatus for the treatment of fresh beef-fat, for the purpose of obtaining therefrom a pure animal oil, which by further treatment, hereafter described, is converted into an artificial butter.

The drawing is a side sectional elevation of the apparatus we employ.

Animal fat consists of three principal constituents—oleine, margarine, and stearine—enveloped in, and surrounded by, animal tissue. Of these constituents oleine is fluid, margarine and stearine solid, at ordinary temperatures.

The object of our improvements is, first, to separate the fluid oleine from the other materials with which it is intimately blended; second, to convert the oleine by subsequent treatment into what we call "artificial butter," both objects being attained by the improved process and apparatus hereafter described.

We select that part of the fat of beeves known as "caul-fat," or that which surrounds the stomach. This, in its fresh state, is thoroughly and repeatedly washed with cold water until all the animal heat is removed, and all adhering animal matter and dirt washed away, and the material is cold and perfectly clean. Until used the fat is suspended on racks in a cool room to prevent decomposition.

For the purpose of softening and still further cleansing and purifying the fat previous to the next stage of treatment, it is exposed to the vapor of water in iron tanks at a temperature sufficient merely to soften, but not to melt, the material. This treatment is continued for ten or fifteen minutes.

After softening, the fat is finely hashed, in order to break up the animal tissue, and render the mixture of combined fats uniform, and better adapted for the ready separation of the contained fatty bodies from the waste material surrounding them. Any convenient method may be employed for mincing or finely hashing the material. We prefer for this purpose a machine used by sausage-makers for mincing meat, and in common use. The machine consists substantially of knives set after the manner of the threads of a screw upon a shaft which revolves within a cylinder with a removable top. The knives not only cut the fat very fine, but, after cutting, force it through one of the ends of the cylinder, which is pierced with fine holes like a sieve. By this means the cellular structure of the material is broken up, and the mixed fat and tissue rendered more easy of separation in the next stage of the process.

We next submit the mixed hashed fat and tissue to the indirect heat of steam in iron caldrons for a period of from half an hour to one hour, or until the "scrap"—that is, the tissue and superfluous solid animal matter—has settled to the bottom. These caldrons consist of an outer vessel, A, and an inner vessel, B, (see drawing,) a steam-space being left between them. The inner vessel A receives the hashed fat, and is heated by steam, which is admitted, by the pipe C, to the space S between the two vessels, the steam thus imparting its heat to the contents of the interior vessel A. D is a stop-cock to draw off the water of condensation in the space S. The pressure of the admitted steam to S is intended to be between forty and sixty pounds per square inch, or sufficient to yield a temperature which will liquefy all the fat contained in the vessel A. The scrap and liquid fat are drawn off from the caldrons by the stop-cock E.

In order to facilitate the separation of the fatty matters from the solid tissues or other animal matter, the mixture is kept thoroughly agitated during the time it is submitted to heat in the caldron A by means of a blast of hot air, which is blown into the hot mass of fat by means of a tube, F, leading to a rose, *f*, near the bottom of the caldron. The air is heated for the purpose by placing a portion of the tube F in the form of a coil within a steam-tight chest, G, to which steam is admitted by the pipe H. The exterior end of the coil F is connected with an ordinary fan or other apparatus for blowing air. I is a stop-cock for drawing off water of condensation in the steam-chest G.

For the sake of economy and convenience the steam supplied to the steam-chest G also supplies the caldrons A B. The blast of hot air, introduced as shown, keeps up a violent and thorough agitation of the hot mass, and greatly assists its rapid purification.

The agitation of the fats when exposed to heat has hitherto been effected by hand by means of paddles or stirrers, but by this new method much labor and expense are saved, and a more perfect purification of the mass is obtained. When the material in the caldrons has been exposed to the action of heat for from half an hour to one hour, and thoroughly agitated during that time by the injected blast of hot air, as described, the air is shut off, when the scrap, which is of greater specific gravity than the fat, settles to the bottom, and is drawn off separate from the fatty material above by the stop-cock E and rejected. We now remove the mixed melted fats from the caldron in suitable vessels to a room, in which, by steam-pipes or other means, the temperature is maintained at a heat of 110° Fahrenheit. The fat is here allowed to settle for a period of twelve hours. During this time it separates into a fluid fat, which rises to the surface, and a semi-solid portion, which falls to the bottom. These are separated by decanting the fluid portion, and the solid fat, which constitutes about five per cent. of the whole, is returned to the steam-caldron, to be again submitted to the action of heat with a fresh portion of beef-fat. The decanted fluid fat, still holding in solution a considerable quantity of solid fat or stearine, is poured into clean cotton bags or filters and submitted to strong pressure between metallic plates in a powerful press. The operation of pressing is carried on in the settling-room, where the temperature is maintained at 110° Fahrenheit, for the purpose of preventing any crystallization or solidification of the mixed fats until they are separated. By the operation of the press a pure yellow oil is expressed, leaving behind in the filters a large proportion of solid fat or stearine, which can be utilized in the manufacture of candles.

By means of the process and apparatus described, we obtain a pure yellow oil of beef-fat, which, in order to convert it into artificial butter, we submit to the following treatment: The oil obtained by expression from the mixed fats in the press is churned in the ordinary way with buttermilk, in the proportion of eighteen quarts of buttermilk to twenty-two pounds of oil. The churning is done in a cool room. After the mixture has assumed a semi-fluid condition, or the butter has come, it is allowed to remain in the churn until it "breaks." The butter is then removed from the churn and allowed to remain over night, or twelve hours, before working. The butter is then worked on a table, like ordinary butter, colored with some harmless preparation, salted and packed in firkins, ready for market, forming a fine, palatable butter without grain.

We do not limit or confine ourselves to the precise form of apparatus herein described, as the same may be varied without departing from our invention. We do not claim the extraction of oleomargarine from animal fats, nor the product obtained from treating animal fats at a low temperature and by pressure, nor the churning of oleomargarine or fats extracted by pressure with milk or cream to produce an article resembling butter, since these are not our invention; but

Having thus described our invention, we claim as new, and desire to secure by Letters Patent—

1. In the manufacture of artificial butter, the process herein described of softening, washing, and disintegrating the fat of animals for the purpose of rendering the oleomargarine and stearine separable from the membraneous tissues, in combination with the process of heating the said hashed fat by steam for the purpose of melting the same and rendering its elements mobile, and of forcing hot air through the same while in the heating-caldron for the purpose of effecting the thorough separation of said oleomargarine and stearine from the useless tissues, by means of which the oleomargarine and stearine are eliminated from the tissues, and left in such relative positions in the caldron as to be readily separated, as described.

2. The process herein described of eliminating the tissues from the oleomargarine and stearine by the introduction of blasts of hot air, and of maintaining the eliminated pure fats at a temperature of 110° Fahrenheit for twelve hours, after which the partial separation of the oleomargarine and stearine is accomplished by decantation, in combination with the complete separation of the oleomargarine from the stearine by compression in cotton bags at a temperature of about 80° Fahrenheit, under which oleomargarine is a liquid and stearine a solid, as described.

3. The agitating and purifying apparatus herein described, consisting of the double-case caldron B, with stop-cocks D and E, steam-space S, pipe C, steam-chest G, and hot-air pipe F, terminating in a rose in the bottom of caldron, as and for the purpose specified.

WILLIAM L. CHURCHILL.
JACOB L. ENGLEHART.

Witnesses for ENGLEHART:
  T. B. MOSHER,
  SOLON C. KEMON.
Witnesses for CHURCHILL:
  MAURICE FRANK,
  R. C. BREWSTER.